United States Patent [19]

Auriol et al.

[11] 4,356,215

[45] Oct. 26, 1982

[54] METHOD OF MANUFACTURING SUPPORTS FOR POROUS FILTERS

[75] Inventors: Alain Auriol; Paul Tritten, both of Tarbes, France

[73] Assignee: Commissariat a l'Energie Atomique, Paris, France

[21] Appl. No.: 497,953

[22] Filed: Aug. 15, 1974

[30] Foreign Application Priority Data

Sep. 28, 1973 [FR] France ............................... 73 34827

[51] Int. Cl.$^3$ .............................................. B05D 5/00
[52] U.S. Cl. ....................................... 427/244; 55/523; 55/524; 264/49; 264/125; 427/368; 427/419.2; 427/419.3
[58] Field of Search ............... 55/523, 524; 75/208 R; 264/49, 125; 427/244, 368, 419.2, 419.3

[56] References Cited

U.S. PATENT DOCUMENTS 3,748,105 7/1973 Reen et al. ......................... 75/208 R
3,874,899 4/1975 Miszenti et al. ...................... 55/523

Primary Examiner—Leland A. Sebastian
Attorney, Agent, or Firm—Kerkam, Stowell, Kondracki & Clarke

[57] ABSTRACT

The invention relates to a method of manufacturing supports for porous filters.

Supports are placed in contact with a first slip coating liquid containing in suspension a mineral powder comprising agglomerates between 10 and 30 microns in diameter, the resulting deposited layer is dried by heating it to approximately 100° C., the layer is brushed so as to remove particles of powder which have not penetrated inside the pores, the thus-treated supports are placed in contact with a second slip coating liquid containing in suspension a mineral powder having a particle size between 1 and 8 microns, and the products obtained are heat-treated at approximately 1500° C.

The resulting filters are used for separating isotopes.

3 Claims, No Drawings

METHOD OF MANUFACTURING SUPPORTS FOR POROUS FILTERS

The invention relates to a method of manufacturing supports for microporous filters having high permeability and, more particularly, to supports for tubular filters used for manufacturing porous filters or barriers used for separating certain isotopes. The invention also relates to the filter supports thus obtained.

Each filter comprises a microporous layer having a pore diameter of the order of 0.01 micron and a macroporous support having a pore diameter of the order of a few microns, the two components being strongly bonded to one another.

In order to improve the quality of the supports, i.e. increase their permeability without increasing the pore diameter of the microporous layer and without reducing the thickness of the macroporous supports and thus reducing the rigidity and adversely affecting the quality of the filters, it is clearly necessary to increase the pore diameter of the supports. This is the main object of the invention.

According to the invention there is provided a method of manufacturing filter supports, in which a rigid macroporous support having pore diameters of approximately 15 to 20 microns is placed in contact with a first slip coating liquid containing in suspension a mineral powder comprising agglomerates between 10 and 30 microns in diameter, the resulting deposited layer is dried by heating it to approximately 100° C., the layer is brushed so as to remove particles of powder which have not penetrated inside the pores, the resulting supports are placed in contact with a second slip coating liquid containing in suspension a mineral powder having a particle diameter between 1 and 8 microns, and the products obtained are heat-treated at approximately 1500° C.

The method can be used to obtain supports having much greater permeability than obtained by a single slip coating, given an identical macroporous support pore radius.

The first slip coating may comprise alumina which penetrates only slightly into the pores of the macroporous support, since the alumina is made up of relatively large agglomerates.

The first slip coating prevents the second slip coating from penetrating, so that the macroporous supports used can have a higher pore radius than supports used in the prior art methods.

Even if some of the first slip penetrates inside the pores of the macroporous supports, it only slightly reduces the permeability of the ultra-filters, since the alumina agglomerates have low density and occupy only a small volume after being sintered.

The invention is illustrated by the following non-limitative embodiments, which substantially comprise three operations.

EXAMPLE I.

I-Construction of a porous tube

A paste is prepared from a mixture of 75% electromelted alumina having an average particle size of 35 microns and 25% Alcoa alumina having a specific surface of approximately 1 m²/g, added to a mixture of 10 to 15% petrolatum and 10 to 15% of a 10% Modocol gel. These quantities are given in percentages by weight with respect to dry alumina.

The resulting paste is extruded at a pressure of 100 bars in the form of tubes 1 meter long, 1 to 2 cm in diameter and 1 to 2 mm thick.

The tubes are then dried so as to expel the organic binders and heat-treated in a reducing atmosphere at 1750° C.; the resulting permeability is $180,000.10^{-7}$ $M/cm^2/min/cm\ Hg$.

II-First slip coating

The first slip coating is applied using an aqueous suspension containing 9.5% by weight of commercial 5 AO Baikowski alumina. A good dispersion is obtained by stirring 800 g of the suspension at 60 rps for 15 hours in a polyethylene bottle 200 mm in diameter and 400 mm long, containing a charge of 4 kg ceramic balls 20 mm in diameter.

In the slip coating operation, the suspension is raised under pressure and lowered in the tube, which is vertically positioned on a sealing-tight nozzle connected to the tank containing the suspension. The operation lasts 4 to 5 seconds. After being dried, the interior of the tube is brushed while the tube is rotating, so as to remove any excess thickness of alumina.

III-Second slip coating

The second slip coating is applied by using a suspension prepared by mixing 100 ml of slip A defined hereinafter, 130 g petrolatum and 400 g of oil of turpentine.

Slip A comprises the following:

A commercial 5 AO Baikowski alumina calcined at 1450° C. having a specific surface of the order of 1 m²/g and a particle size between 1 and 5 microns. 7.5% sugar, with respect to the weight of dry alumina, 0.83% benzyl alcohol, with respect to the weight of dry alumina, 0.26% ammonium sulphoricinolate, with respect to the weight of dry alumina, 41% light-coloured colophony, with respect to the weight of dry alumina, 37.5% linseed oil, with respect of the weight of dry alumina, and 112% oil of turpentine, with respect to the weight of dry alumina.

A good alumina dispersion is obtained by stirring a quantity of slip A corresponding to 800 g alumina at 60 rpm for 60 hours in a polyethylene bottle 200 mm in diameter and 400 mm long, containing a charge of 4 kg ceramic balls 20 mm in diameter.

The coating operation is performed as already described. The tube is dried and heat-treated in an oxidising atmosphere at 1500° C. Its permeability is of the order of 60 000 to 80 000 permeability units. A permeability unit is equivalent to $10^{-7}\ M/cm^2/min/cm\ Hg$, M being a gram molecule of diffusing gas. The pore diameter of the inner layer is of the order of 1 micron, and its thickness is 20 to 30 microns.

EXAMPLE III.

I-Manufacture of a porous tube
  Same as in Example I.
II-First slip coating
  Same as in Example I.
III-Second slip coating This is applied using a suspension prepared by mixing 100 ml of a slip B defined hereinafter, 120 g petrolatum, 10 g soya lecithin and 407.3 g oil of turpentine.

Slip B comprises:
commercial SR 900 Societe francaise d'Electro-Metallurgie electro-melted alumina, having an average particle size of 6 to 7 microns, 5 AO Baikowski alumina calcined at 1450° C. (20% by weight of SR 900) soya lecithin (0.85% by weight of SR 900) oil of turpentine (56.3% by weight of SR 900) light-coloured colophony (45% by weight of SR 900) linseed oil (37.2% by weight of SR 900).

In order to obtain a good alumina dispersion, the mixture, comprising 600 g SR 900 and quantities of soya lecithin and oil of turpentine corresponding to the above-mentioned proportions of calcined alumina, is stirred at 30 rpm for 30 hours in a polyethylene bottle 200 mm in diameter and 400 mm long containing a charge of 4 kg ceramic balls 20 mm in diameter. Next, after the corresponding quantities of light-coloured colophony and linseed oil have been added, the complete slip B is again stirred for 30 hours in the same vessel and under the same conditions.

The coating operation is performed as described in Example I. The tube is dried and heat-treated in an oxidising atmosphere at 1600° C. Its permeability is of the order of 60 000 to 80 000 permeability units. The pore diameter of the inner layer is of the order of 1.6 to $2\mu$ and the thickness of the tube is 30 to 40 microns.

We claim:

1. A method of manufacturing filter supports, wherein rigid macroporous supports having pore diameters of approximately 15 to 20 microns are placed in contact with a first slip coating liquid containing in suspension a powder of refractory oxides comprising agglomerates between 10 and 30 microns in diameter, the resulting deposited layer is dried by heating it to approximately 100° C., the layer is brushed so as to remove particles of powder which have not penetrated inside the pores, the resulting supports are placed in contact with a second slip coating liquid containing in suspension a powder of refractory oxides having a particle diameter between 1 and 8 microns, and the products obtained are heat-treated at approximately 1500° C.

2. A method of manufacturing filter supports according to claim 1, characterised in that the first slip coating is applied using an aqueous suspension containing 9.5% alumina.

3. A method of manufacturing filter supports according to claim 1, characterised in that the second slip coating is applied using an alumina-based slip and an organic binder.

* * * * *